(12) United States Patent
Grill

(10) Patent No.: US 9,248,974 B2
(45) Date of Patent: Feb. 2, 2016

(54) CLEANING APPARATUS, METHODS OF MAKING CLEANING APPARATUS, AND METHODS OF CLEANING

(71) Applicant: Mark S. Grill, Clinton, UT (US)

(72) Inventor: Mark S. Grill, Clinton, UT (US)

(*) Notice: Subject to any disclaimer, the term of this patent is extended or adjusted under 35 U.S.C. 154(b) by 100 days.

(21) Appl. No.: 13/791,548

(22) Filed: Mar. 8, 2013

(65) Prior Publication Data
US 2014/0251762 A1  Sep. 11, 2014

(51) Int. Cl.
*B65G 45/22* (2006.01)

(52) U.S. Cl.
CPC .................................. *B65G 45/22* (2013.01)

(58) Field of Classification Search
USPC ............................... 198/495; 15/104.8
See application file for complete search history.

(56) References Cited

U.S. PATENT DOCUMENTS

| | | | |
|---|---|---|---|
| 3,872,539 A | 3/1975 | Doyel | |
| 3,879,785 A * | 4/1975 | Roth et al. | 15/1.51 |
| 4,209,870 A | 7/1980 | Doyel | |
| 4,423,532 A | 1/1984 | Yagi et al. | |
| 4,570,286 A | 2/1986 | Ross | |
| 4,725,292 A * | 2/1988 | Williams | 95/278 |
| 4,748,712 A | 6/1988 | DiGiovanni | |
| 4,841,594 A | 6/1989 | Elson et al. | |
| 4,928,346 A | 5/1990 | Elson et al. | |
| 4,972,541 A | 11/1990 | Smith, Jr. | |
| 5,074,008 A | 12/1991 | Palomino, Jr. | |
| 5,203,047 A | 4/1993 | Lynn | |
| 5,309,597 A | 5/1994 | Wymore | |
| 5,327,609 A | 7/1994 | Bierma et al. | |
| 5,480,544 A * | 1/1996 | Cottam | 210/304 |
| 5,680,696 A * | 10/1997 | Bonura et al. | 29/732 |
| 5,832,559 A | 11/1998 | Kang | |
| 5,943,725 A | 8/1999 | Wandres | |
| 6,026,541 A | 2/2000 | Bailet et al. | |
| 6,049,944 A | 4/2000 | Lopez | |
| 6,206,175 B1 * | 3/2001 | Tschantz | 198/493 |
| 6,370,731 B1 | 4/2002 | Carter | |
| 6,481,043 B1 | 11/2002 | Anderson et al. | |
| 6,530,114 B2 | 3/2003 | Bailey et al. | |
| 6,647,586 B2 | 11/2003 | Rogers et al. | |
| 6,799,350 B1 | 10/2004 | Gordon | |
| 7,017,227 B2 | 3/2006 | Scott | |

(Continued)

OTHER PUBLICATIONS

Dyson DC41 Animal Ball Upright Vacuum Cleaner With Bonus Stiff Brush, Dusting Brush, and Multi Angle Brush; http://bestemporium.net/details.php?id=13964; 2012; 1 page.

*Primary Examiner* — Gene Crawford
*Assistant Examiner* — Lester Rushin
(74) *Attorney, Agent, or Firm* — Loza & Loza, LLP; Tyler Barrett

(57) ABSTRACT

Devices for removing particulate from surfaces may include at least one belt coupled with at least one guide to rotate the belt(s) about the guide(s). A vacuum cavity may be disposed around a portion of the belt(s) to remove captured particulate therefrom when a negative pressure is introduced in the vacuum cavity. A surface may be cleaned by rotating a dry belt about a guide and positioning a portion of the dry belt on the surface to capture and collect particulate. A portion of the dry belt can pass into a vacuum cavity, and collected particulate may be removed from the dry belt into the vacuum cavity. A cleaning apparatus may be formed by coupling a belt to a guide so the belt can rotate around the guide. A vacuum cavity can be disposed to encompass a portion of the belt. Other aspects, embodiments, and features are also included.

17 Claims, 7 Drawing Sheets

(56) References Cited

U.S. PATENT DOCUMENTS

| | | |
|---|---|---|
| 7,086,115 B1 | 8/2006 | Rex et al. |
| 7,465,132 B2 | 12/2008 | Gipson |
| 7,478,457 B2 | 1/2009 | Kertz |
| 7,552,507 B2 | 6/2009 | Burnham |
| 7,784,137 B2 | 8/2010 | Knopow |
| 7,784,149 B2 | 8/2010 | Schwartz et al. |
| 7,950,105 B2 | 5/2011 | Elsworthy |
| 2004/0020006 A1 | 2/2004 | Muller |
| 2005/0005374 A1 | 1/2005 | Weber et al. |
| 2006/0010626 A1 | 1/2006 | Sjoberg |
| 2006/0026788 A1 | 2/2006 | Fischer et al. |
| 2006/0037173 A1 | 2/2006 | Gursel |
| 2006/0179605 A1 | 8/2006 | Greene |
| 2006/0179607 A1 | 8/2006 | Ptak et al. |
| 2006/0248679 A1 | 11/2006 | Smith |
| 2006/0272121 A1 | 12/2006 | Wai |
| 2007/0192972 A9 | 8/2007 | Kimball |
| 2009/0113665 A1 | 5/2009 | Kertz |
| 2010/0043169 A1 | 2/2010 | Watzke |
| 2010/0186771 A1 | 7/2010 | Rahbar-Dehghan |
| 2010/0242991 A1 | 9/2010 | Haas et al. |
| 2011/0036373 A1 | 2/2011 | Hilton |
| 2012/0167317 A1 | 7/2012 | Garcia |

\* cited by examiner

CLEANING APPARATUS, METHODS OF MAKING CLEANING APPARATUS, AND METHODS OF CLEANING

TECHNICAL FIELD

The following relates generally to cleaning devices, and more specifically to methods and devices for efficiently removing particulate and/or matter from various surfaces.

BACKGROUND

The accumulation of dust, dirt, sediment, particulate and other matter on objects and surfaces has long been a factor in everyday life. Whether in the home, the business, commercial/industry or public spaces etc., the desire to remove such accumulations of dust, dirt, sediment, particulate and other matter from objects and surfaces for purposes of cleanliness, health, appearance etc. has similarly been an ongoing chore for people in their homes, businesses, commercial/industry and public spaces etc.

Various devices and means have been utilized for the task of dusting/cleaning of objects and surfaces, including dusting cloths, feather dusters, air-flow/vacuum techniques, brushes, chemical sprays, wipes etc. Many of these devices and means have found their use, and a certain degree of success.

However, it has been that such devices and means in the task of dusting/cleaning of objects and surfaces do come with their inherent limitations and drawbacks. Feather dusters tend to get dirty and increasingly tend to just move excess dust and particulate from one location to another or into the air, then to settle back onto either the original surface or onto another surface, and only to have to be moved or picked up again. Dusting cloths get soiled and have to be repeatedly washed and/or discarded. Air-flow/vacuum techniques can be effective but can be insufficient without the added use of brushes, bristles or high-pressures that also tend to further disperse such dust and particulate. Chemical sprays may be effective but can be more costly and/or produce more waste due to the containers in which they are kept and the paper towels and other application devices needed to assist in their use; then the chemicals are depleted and must be replaced with additional purchase and added waste to the user and to the environment. Other hand-held disposable devices that have come into use can also be effective, but soon lead to waste once they become soiled and ineffective, and need to be replaced.

BRIEF SUMMARY OF SOME EXAMPLES

Various examples and implementations of the present disclosure facilitate cleaning of surfaces in an efficient and effective manner. According to at least one aspect of the present disclosure, cleaning apparatus are provided. In one or more examples, such cleaning apparatus may include one or more belts. At least one guide can be coupled to the at least one belt and adapted to rotate the at least one belt thereabout. A vacuum cavity can be disposed around at least a portion of the at least one belt to facilitate removal of particulate captured by the at least one belt when a negative pressure is introduced within the vacuum cavity.

Further aspects of the present disclosure include methods of cleaning. According to at least one example, such methods may include rotating at least one dry belt about one or more guides. A portion of the at least one dry belt can be disposed on a surface to be cleaned, to capture and collect particulate from the surface. A portion of the one or more dry belts can be passed into a vacuum cavity, and particulate collected by the dry belt can be removed from the dry belt into the vacuum cavity.

Yet additional aspects of the present disclosure include methods of making a cleaning apparatus. In one or more examples, such methods may include coupling a brushless belt to a guide so the belt can rotate around at least a portion of the at least one guide. A vacuum cavity can be disposed to encompass a portion of the belt to facilitate removal of particulate from the portion of the belt when a negative pressure is introduced within the vacuum cavity.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details.

The illustrations presented herein are, in some instances, not actual views of any particular cleaning apparatus, but are merely idealized representations which are employed to describe various features associated with the present disclosure. Additionally, elements common between figures may retain the same numerical designation.

Figure 1:
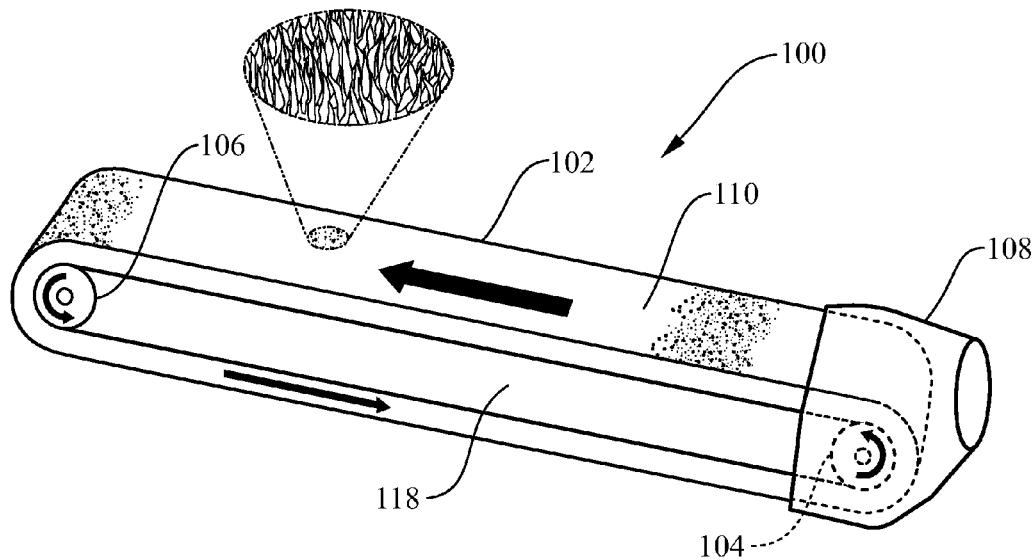
FIG. 1 is an isometric view of a cleaning apparatus according to at least one example of the present disclosure.

Various aspects of the present disclosure relate to cleaning apparatus adapted to facilitate surface cleaning. FIG. 1 is an isometric view of a cleaning apparatus 100 according to at least one example. The cleaning apparatus 100 includes a belt 102 disposed about one proximal guide 104 and about one distal guide 106. The proximal guide 104 and the distal guide 106 in this example are affixed to opposing ends of a plane 118 thereby forming a track along which the belt 102 travels during operation of the cleaning apparatus 100. A vacuum cavity 108 is also disposed adjacent to at least a portion of the belt 102 to facilitate the removal of particulate therefrom when a negative pressure is introduced within the vacuum cavity 108. In at least some embodiments, the vacuum cavity 108 is positioned to encompass a portion of the belt 102, such that the belt 102 travels into, and is surrounded by, the vacuum cavity 108 during operation.

Figure 2:
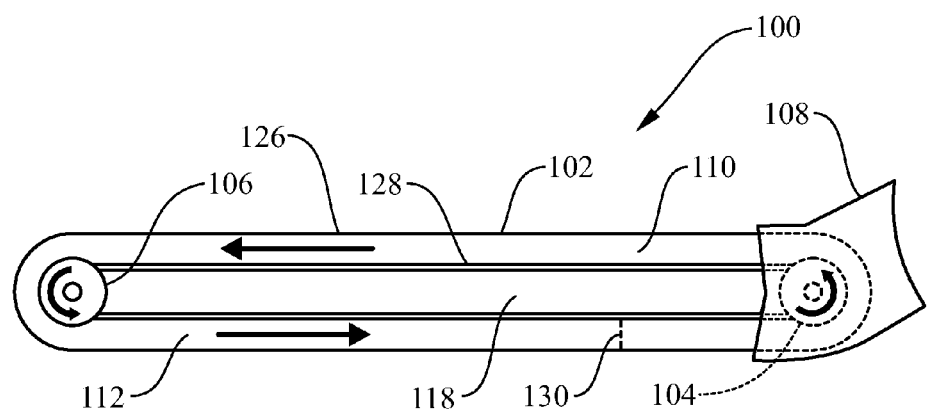
FIG. 2 is a side view of the cleaning apparatus of FIG. 1 according to at least one example.

Referring to FIG. 2, a side view of the cleaning apparatus 100 of FIG. 1 is illustrated. As the belt 102 travels, a belt inner surface 128 travels continuously about the proximal guide 104, the plane 118 and the distal guide 106 in a continuous manner while a belt outer surface 126 is applied to surfaces and objects to capture and collect particulate. In this example, when the cleaning apparatus 100 is powered on, belt upper region 110 travels away from the proximal guide 104 and toward the distal guide 106 while belt lower region 112 travels away from the distal guide 106 and toward the proximal guide 104 and into the vacuum cavity 108 so that particulate captured by the belt 102 may be removed from the belt 102 and enter the vacuum cavity 108. This process refreshes the belt 102 so that as the belt 102 again travels out from the vacuum cavity 108 and away from the proximal guide 104, the belt 102 may be continually applied to more surfaces and objects while maintaining its ability to effectively capture and collect more particulate, and hence clean numerous surfaces and objects. According to an aspect, the belt 102 can operate in a dry environment. In other words, the belt 102 remains dry during operation, while still capturing and collecting particulate without being wetted and without dampening or wetting the surface to be cleaned.

The belt 102 may be formed of any materials adapted to facilitate capture of particulate from a surface to be cleaned. For instance, the belt 102 may be formed of a filament-laden material such as supple pile plush which may be crowded thin polyester threads or other fine, soft, pliant thread pile suitably adapted for capturing and collecting particulate, and releasing collected particulate into the vacuum cavity 108. Longer pile and softer filaments or threads of material can make possible the cleaning of more delicate surfaces and objects with lesser likelihood of incident such as breakage or scratching. The thin filaments may carry electro-static charge which can help to attract and/or retain particulate and/or matter. The belt inner surface 128 to which the filaments or threads are attached at one end, may further include material which can increase the durability of the belt inner surface 128, and which can provide greater grip when traveling about the guides 104, 106.

In other instances, the belt 102 may be formed of a non-filament laden material, such as nonwoven or bonded fabrics. Yet in other instances, the belt 102 may be formed of woven material, such as sheets of woven cloth.

In some embodiments, the belt 102 is a brushless belt. A brushless belt includes a belt 102 that is free from stiff bristles. In some examples, such a brushless belt 102 includes filament-laden materials as described above. Such filament-laden materials are adapted to retain or collect particulate without the use of a liquid to wet the material. In this manner, the brushless belt 102 can facilitate cleaning without dampening or wetting the surface to be cleaned. A brushless belt refers to the belt being free from bristles, as such bristle may tend to push particulate rather than capture. In such examples the belt may be adapted to operate completely dry. During operation there is no liquid sprayed onto or otherwise introduced to the belt as it travels along the track.

In various instances the materials used to form the belt 102, whether filament-laden, non-filament laden, woven, or nonwoven may be washable in water or using a conventional washing machine so that the life and efficacy of the belt 102 are further enhanced. In examples utilizing filament-laden material, cleansing of the filament-laden material can promote the renewal of its particulate-capturing effectiveness.

In some examples the belt 102 may be constructed to include an optional disconnection feature 130 as shown in FIG. 2. The disconnection feature 130 enables the transformation of the belt 102 from a continuous belt to a strap. This transformation may facilitate the replacement, repair, washing and reinstallation of numerous belts 102. The disconnection feature 130 may utilize various means including clasp, zipper, hook-and-loop material, zip strip and the like.

In other examples the belt 102 may simply be removed from, and reinstalled to the cleaning apparatus 100 by slipping it off the guides 104, 106 and back onto the guides 104, 106. The removal of the belt 102 in various examples may allow easier repair, cleaning, maintenance, replacement and the like with regard to components and related parts not readily as accessible with the presence of an installed belt.

The guides 104, 106 in some examples may be free-rotating so that as the belt 102 is in motion, the belt 102 passes against the guide 104, 106 which in turn causes the guide 104, 106 to neutrally rotate and continually pass the belt 102 along. The guides 104, 106 may be formed of plastic, wood, metal, alloy or any suitable material, may have a surface or texture which provides hold when coupled to the belt 102, and may include the use of bearings to improve their free-rotation.

The guides 104, 106 in other examples may be fixed stationary and may be formed of material that provides low friction to enable the belt inner surface 128 to easily glide across the guide 104, 106 during operation. Low friction material used in forming the guides 104, 106 may include plastic, wood, metal, alloy or any suitable material.

Figure 3:
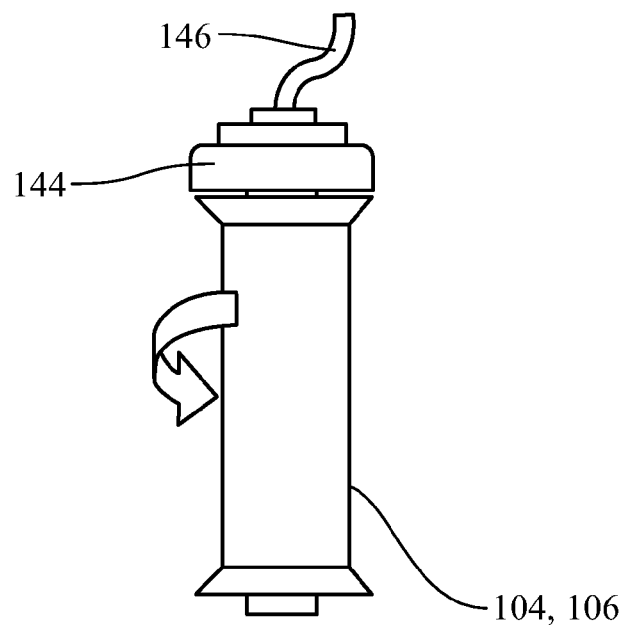
FIG. 3 is a top view of at least one example of a guide in which the guide is electrically powered.

One or both of the guides 104, 106 may be adapted to rotate, in turn rotating the belt 102 coupled thereto. FIG. 3 is a top view of at least one example of a guide 104, 106 in which the guide 104, 106 is electrically powered. In this example the guide 104, 106 is coupled to an electric motor 144 which is supplied electricity by a connected electric wire 146. The guide 104, 106 may be formed of any suitable material and may have a surface or texture which provides hold when coupled to the belt 102.

Figure 4:
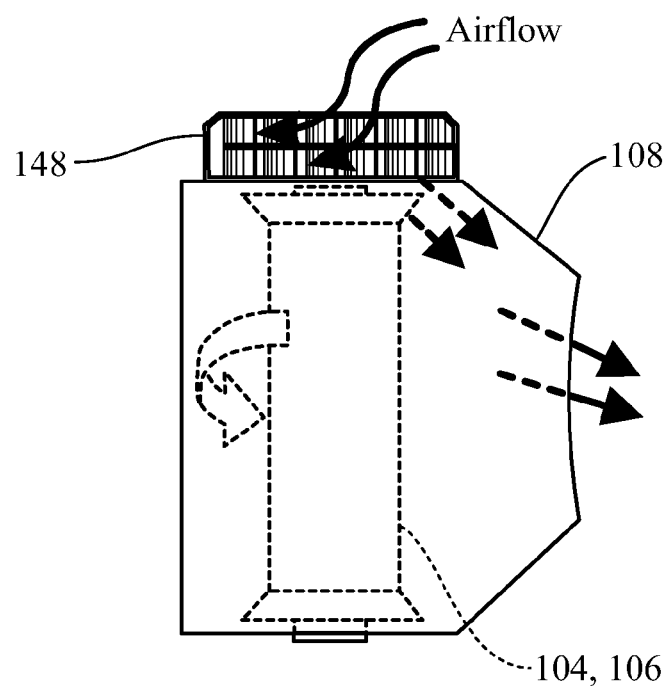
FIG. 4 is a top view of at least one example of a guide in which the guide is air-powered.

FIG. 4 is a top view of at least one example of a guide 104, 106 in which the guide 104, 106 is air-powered. In this example the guide 104, 106 is coupled to an air-powered motor 148. The air-powered motor 148 may have any suitable arrangement of fan, air channels and openings that allow air to flow from outside the motor 148, through the motor 148, and toward a negative pressure. When a negative pressure is introduced, air flow passes through the air-powered motor 148, engaging a fan arrangement, and rotates the guide 104, 106 coupled thereto. The guide 104, 106 may be formed of any suitable material and may have a surface or texture to provide hold when coupled to the belt 102.

As noted above, the guides 104, 106 work in association with a plane 118 to form a track on which the belt 102 travels. Referring again to FIG. 2, the plane 118 can be formed of any suitable material. In some examples, the plane 118 may be at least substantially rigid. A rigid plane 118 will primarily hold its shape and not allow bending or flexing while the cleaning apparatus 100 is in operation. This form of a plane can be useful when cleaning generally flat surfaces such as floors, walls, ceilings and the like.

In other examples, the plane may be at least substantially flexible. A flexible plane may refer to the plane being capable of bending, jointed, adjustable, or otherwise able to change its shape and/or direction. For example, a flexible plane may curve and twist to allow the plane to conform with and/or to reach irregular surfaces and objects more effectively. This type of plane can be useful when cleaning irregular, curved, or harder to reach surfaces.

Figure 5:
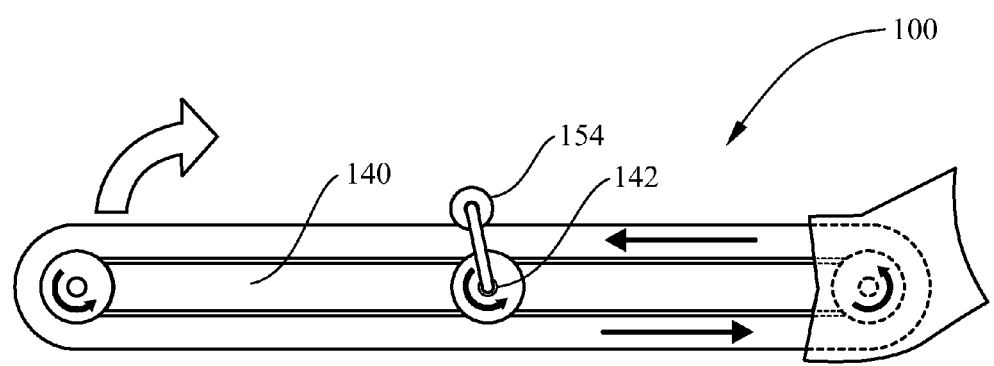
FIG. 5 is a side view of at least one example of a cleaning apparatus wherein the apparatus employs a flexible plane.

FIG. 5 is a side view of at least one example of a cleaning apparatus 100 wherein the apparatus employs a flexible plane. In this example, the plane 140 is jointed and utilizes a plane joint 142 which connects two sections of the jointed plane 140. The two sections of the jointed plane 140 pivot about the plane joint 142 and allow the adjustment of the angle of the two planar sections, thereby transforming the track along which the belt 102 travels. The plane joint 142 may utilize at least one supplementary guide 154 to help keep the belt 102 on track as it travels from one planar section to another planar section of the jointed plane 140.

Figure 6:
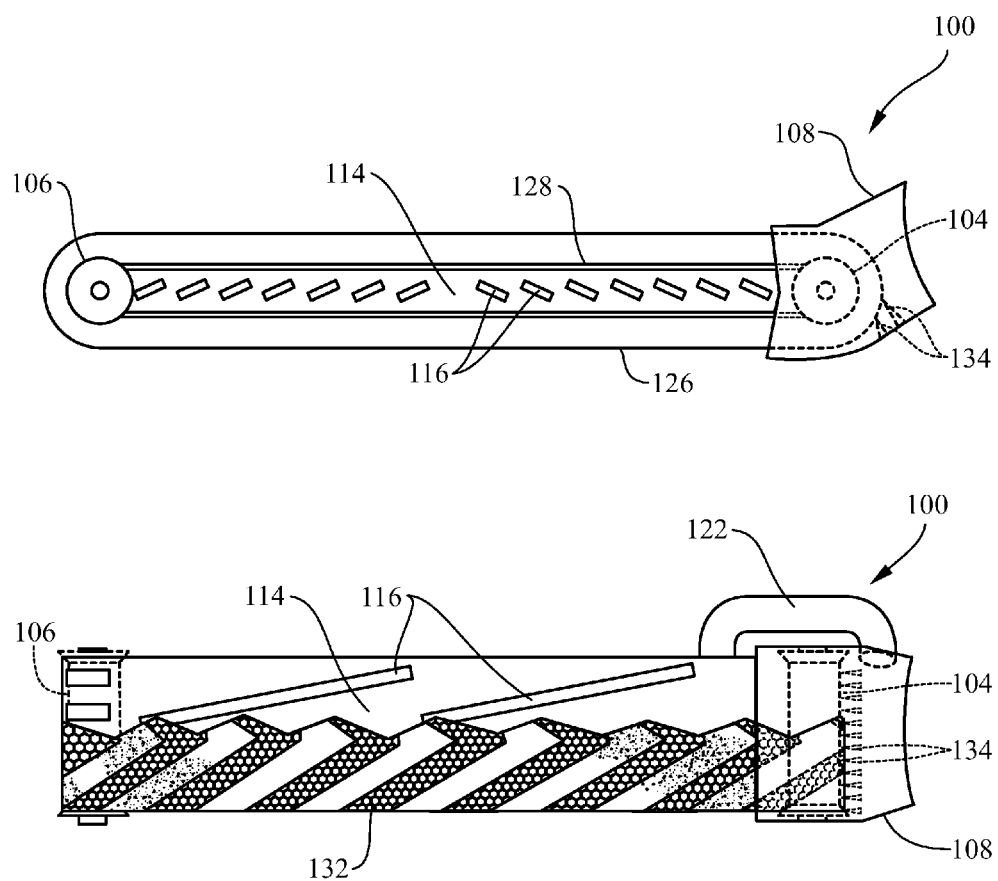
FIG. 6 illustrates a side view and a top view of at least one example of a cleaning apparatus with a planar surface along which the belt travels including a vacuum compartment.

FIG. 6 illustrates a side view and a top view of at least one example of a cleaning apparatus 100 wherein a planar surface along which the belt 132 travels may alternately include a vacuum compartment 114. The vacuum compartment 114 may include one or more orifices 116 located anywhere along the vacuum compartment 114 including its top, bottom, sides, and/or ends.

The vacuum compartment orifices 116 enable the passage of particulate into the vacuum compartment 114 when a negative pressure is introduced therein. The vacuum compartment orifices 116 may be of various size, shape and location to increase the effectiveness of the overall collection of particulate by the vacuum compartment 114. In some embodiments, the vacuum compartment 114 may be at least substantially hollow, and one or more of the guides 104, 106 may simply be a molded end of the hollow form of the vacuum compartment 114. In such an arrangement, the vacuum compartment 114 and the guides 104, 106 may be formed of material that provides low friction to enable the belt inner surface 128 to easily glide across the vacuum compartment 114 and the guides 104, 106 during operation. Low friction material used in forming the vacuum compartment 114 and the guides 104, 106 may include plastic, wood, metal, alloy or any suitable material.

The belt 132 in this example may utilize a plurality of orifices to allow the passage of particulate through the belt 132 en route to the vacuum compartment orifices 116. The direction and/or pattern of the belt 132 orifices and belt 132 materials can also augment the capture and collection of particulate.

Also shown in FIG. 6 is a compartment vacuum-supply tube 122 which provides negative pressure to the vacuum compartment 114. In this example the compartment vacuum-supply tube 122 connects to the vacuum cavity 108 to obtain negative pressure, but in other examples the compartment vacuum-supply tube 122 may obtain negative pressure from other sources including a connection to an integrated vacuum device and a connection to an external vacuum hose or device.

The vacuum cavity 108 in FIG. 6, and in other examples, is supplied negative pressure. The negative pressure serves to extract particulate captured by the belt 132 when the belt 132 passes adjacent to the vacuum cavity 108. The vacuum cavity 108 may be formed of any suitable material and may be of various shape and size that may enhance the effectiveness by which the vacuum cavity 108 extracts particulate from the belt 132. As illustrated in FIG. 6, the vacuum cavity 108 may be equipped with one or more protrusions 134 which may extend slightly against or into the belt outer surface 126 to help free and remove particulate from the belt outer surface 126 and improve overall particulate extraction from the belt 132.

Figure 7:
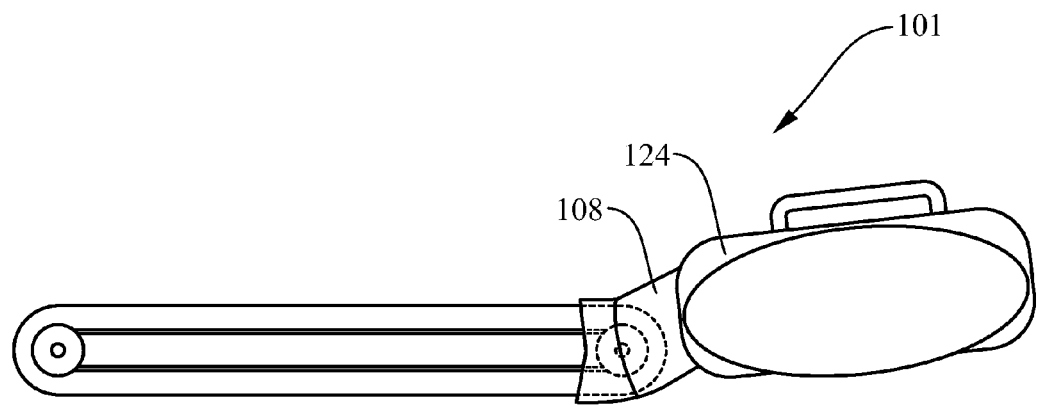
FIG. 7 illustrates a side view of at least one example of a cleaning apparatus including an integrated vacuum device.

FIG. 7 illustrates a side view of at least one example of a cleaning apparatus 101 wherein the vacuum cavity 108 may be supplied negative pressure from an integrated vacuum device 124. As shown, the integrated vacuum device 124 may be coupled to the vacuum cavity 108 in a manner to supply the negative pressure therein. The integrated vacuum device 124 may be of minimal size and weight to be carried and operated by a user while still providing adequate negative pressure to supply the cleaning apparatus 101. The integrated vacuum device 124 can be adapted to utilize various forms of power including but not limited to AC, DC, battery and/or rechargeable battery pack.

Figure 8:
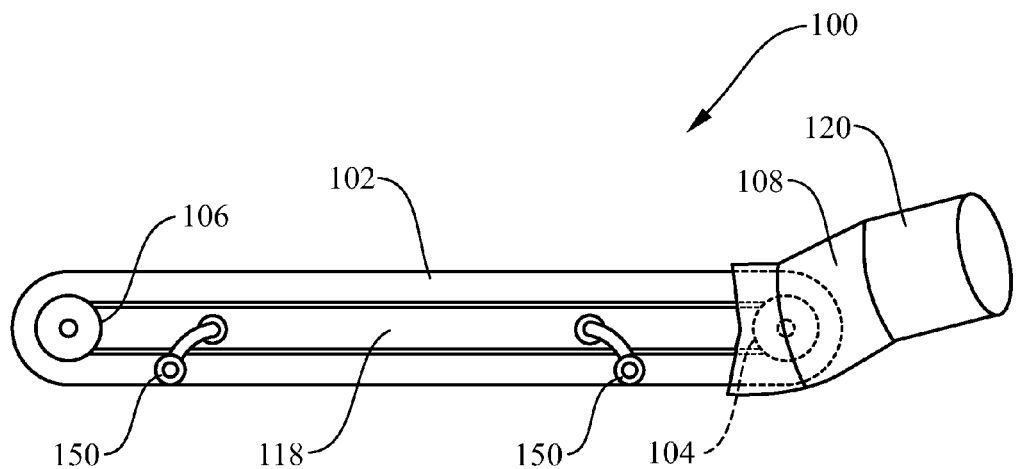
FIG. 8 illustrates a side view of at least one example of a cleaning apparatus with a peripheral vacuum connector and mobility members.

FIG. 8 illustrates a side view of at least one example of a cleaning apparatus 100 including a peripheral vacuum connector 120. In this example, the peripheral vacuum connector 120 can enable a peripheral vacuum device to couple to the vacuum cavity 108. The peripheral vacuum device can then supply negative pressure into the vacuum cavity 108. The peripheral vacuum connection 120 may be attached to various household, automotive, industrial, or other vacuum devices and may be afforded additional versatility by connecting to these devices using hoses, extensions and the like.

Figure 9:
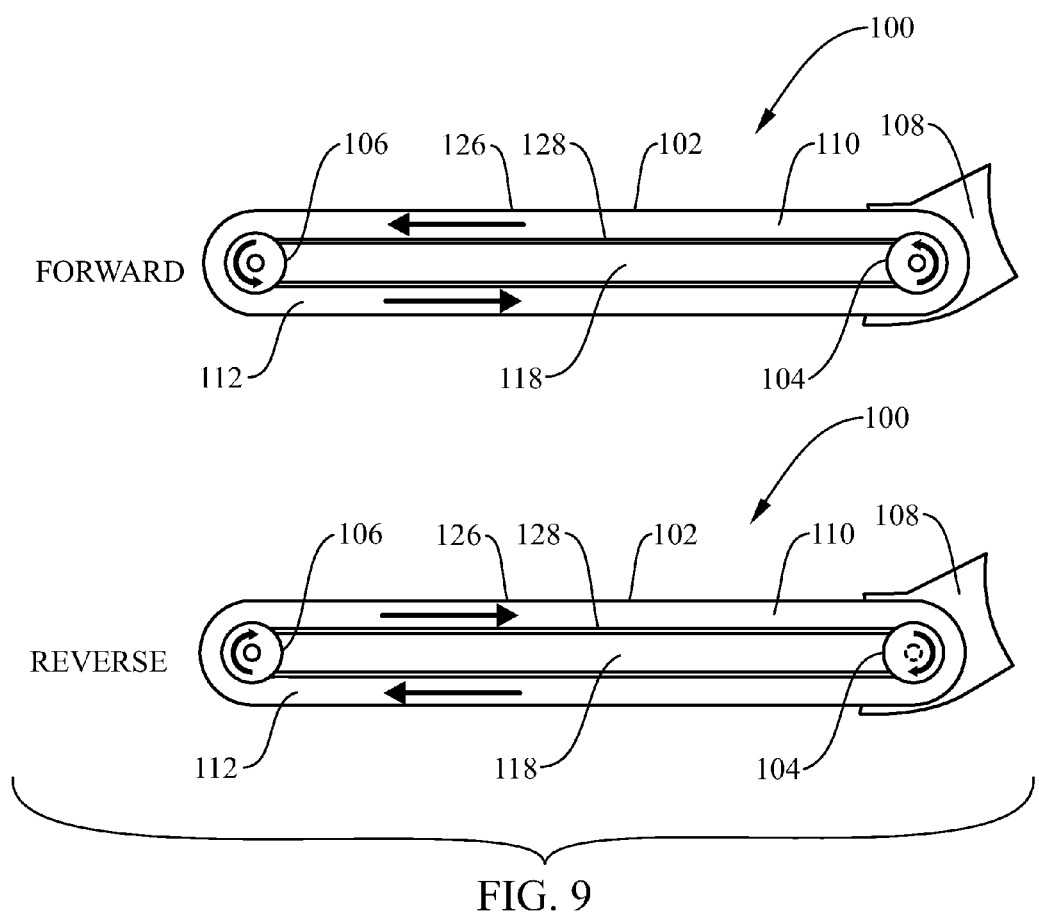
FIG. 9 illustrates two side views of a cleaning apparatus showing different belt directions.

FIG. 9 illustrates two side views of a cleaning apparatus 100. The upper view shows the direction of travel of the belt 102 during forward operation and represented by the arrows, while the lower view shows the direction of travel of the belt 102 during reverse operation and represented by the arrows. In some examples of the cleaning apparatus 100, this reversal of direction may be accomplished whereby one or more of the guides 104, 106 may be adapted to rotate the belt 102 in either forward or reverse direction. This feature can be useful in situations when the user wishes to reverse the direction of travel of the belt 102 for various reasons including the substantial application of the belt upper region 110 to surfaces and objects, and the substantial application of the belt lower region 112 to surfaces and objects. At least one exemplifying situation would be when the user wishes to utilize the apparatus 100 for cleaning ceiling fan blades.

In other examples of the cleaning apparatus 100, the speed of travel of the belt 102 may be adjusted whereby one or more of the guides 104, 106 may be adapted to rotate the belt 102 using multiple variable speeds. In this manner, a user can adjust the speed to a slower or faster speed to ensure that particulate captured by the belt 102 is not thrown from the belt before reaching the vacuum cavity.

Figure 10:
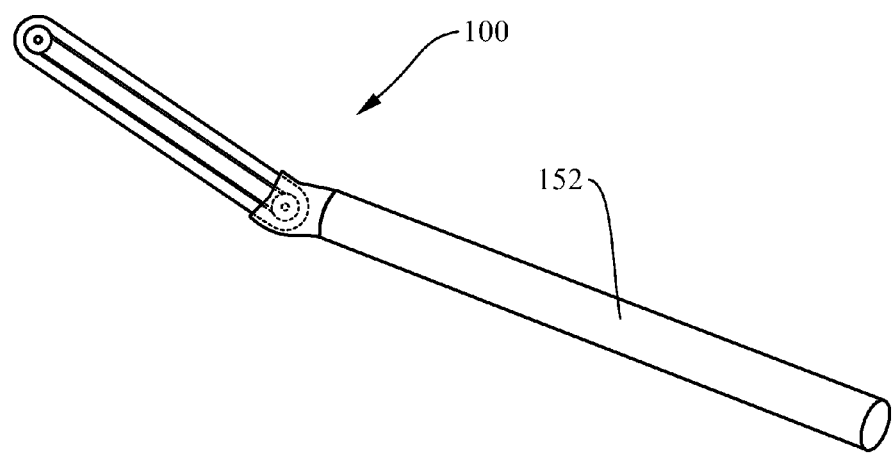
FIG. 10 is a side view of one example of a cleaning apparatus with an extended handle member.

Extended handle members may be utilized with the invention. FIG. 10 is a side view of one example of a cleaning apparatus 100 having an extended handle member 152 adapted to facilitate the use of the cleaning apparatus 100 in harder to reach areas such as ceilings, ceiling fans, walls, floors and the like. The cleaning apparatus 100 may include one or more extended handle members 152. The extended handle member may be a fixed-length member in some embodiments, or the extended handle member may be extendable or telescoping in nature. In some embodiments, the extended handle member may include a plurality of sectional extensions that can be coupled together for varying extension lengths.

Referring back to FIG. 8, a side view of one embodiment of a cleaning apparatus 100, this illustration also includes mobility members 150 affixed to the cleaning apparatus 100. The mobility members 150 are adapted to facilitate the mobility of the cleaning apparatus 100, and adapted to separate at least a portion of the belt 102 from objects and surfaces to be cleaned by a fixed distance. The mobility members 150 may be formed of any material and arrangement adapted to facilitate the mobility of the device. For example, in some instances the mobility members 150 may be formed using plastic balls attached to the sides of a rigid plane 118 by a plastic bar, elbow or other connection means. In other instances, the mobility members 150 may utilize wheels or casters capable of rolling the cleaning apparatus 100 along surfaces including floors, walls, ceilings and the like. And in other instances, the mobility members 150 may utilize a combination of balls, wheels, casters and/or the like. Different examples may utilize connecting the mobility members 150 to different locations on the cleaning apparatus 100 including to a vacuum cavity 108, to guides 104, 106, and to the like. Various examples of a cleaning apparatus 100 utilizing mobility members 150 can be especially useful for arrangements of larger and/or heavier cleaning apparatus 100 such as may be used on floors.

Further embodiments may include additional features to assist ease of use of the apparatus. Such embodiments may include such features as LED or similar light attachment(s) to illuminate surfaces being cleaned and to better expose particulate or matter which is to be removed. Other such embodiments may include robotic automation that can permit non-manual cleaning of particulate or matter from hard floors and/or surfaces, An example would be a device which includes wheels that are supplied power, and sensors that instruct the automated apparatus when to stop and/or make a turn when cleaning a floor of a room or an area.

Figure 11:
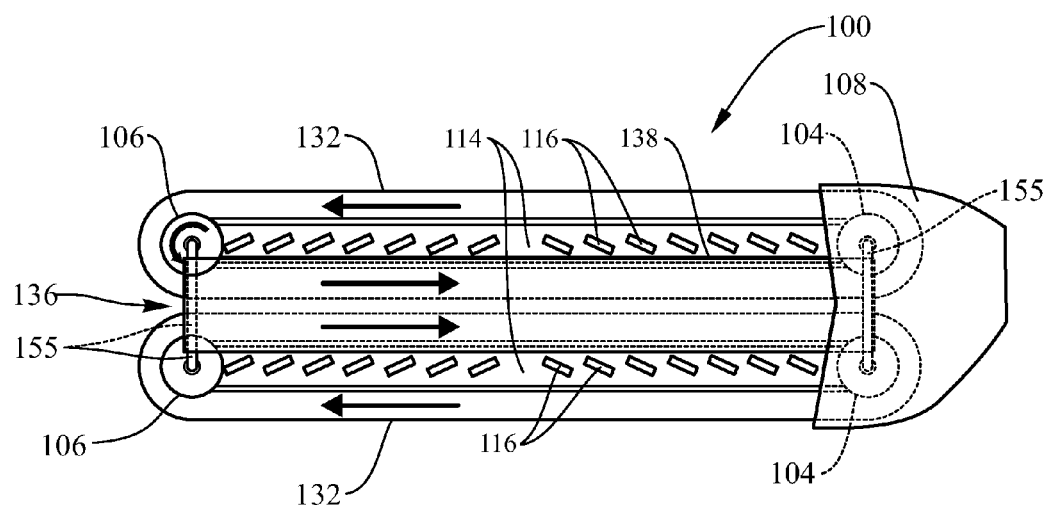
FIG. 11 illustrates a side view of at least one example of a cleaning apparatus including two belts.

Some embodiments of the cleaning apparatus 100 may include more than one belt and/or more than one plane and/or more than one cavity. FIG. 11 illustrates a side view of at least one example of a cleaning apparatus 100 having two belts 132, and each belt 132 being positioned to travel about two opposing planes 114. The planes 114 may be any combination of rigid planes, flexible planes, jointed planes, and vacuum compartment planes with orifices as described above. In this example the planes 114 are both vacuum compartment planes with orifices 116. The belts 132 may be any combination of filament-laden material, non-filament laden material, or material with a plurality of orifices as described above. In this example the distance between the two opposing planes 114 is controlled by the length of the support rod 155 which connects both proximal guides 104 to each other and by the length of the support rod 155 which connects both distal guides 106 to each other. These distances thus establish a gap 136, between the opposing belts 132, for particulate to travel through in a direction (indicated by the arrows) toward the vacuum cavity 108. In this example the two belts pass adjacent to one shared vacuum cavity 108, but in other examples each belt may have a separate vacuum cavity 108. Additionally, in this example, a gap enclosure 138 is placed along each side of the gap 136 to help control flow of particulate captured and collected by the two belts 132. This optional gap enclosure 138 can increase the power of air flow within the gap 136 and between the two belts 132.

In various examples of the cleaning apparatus, and in various examples herein described, the cleaning apparatus 100 can be employed to clean objects and/or surfaces as set forth generally herein above. According to at least one particular example, and with reference to FIG. 2, the belt 102 can be rotated about the proximal guide 104, the plane 118 and the distal guide 106. As the belt 102 rotates, at least a portion of the belt 102 may be disposed on a surface to capture and collect particulate from the surface. As the belt 102 travels, at least a portion of the belt 102 may pass into the vacuum cavity 108. In at least some examples, the portion of the belt 102 is encompassed within the vacuum cavity 108 when it passes therein. When the portion of the belt is inside the vacuum cavity, at least some of the collected particulate may be removed from the belt 102 into the vacuum cavity 108. That is, the negative pressure within the vacuum cavity 108 can pull away from the belt 102 the particulate captured and collected by the belt 102 from the surface being cleaned.

The various adaptations and features herein described can assist the user with operating the apparatus at different distances, at different speeds, at different angles of contact, using various materials, using forward or reverse operation, using different arrangements, using different power sources, and/or using the cleaning apparatus in conjunction with or without other vacuum devices as is useful or necessary for cleaning the desired surfaces and objects, and removing particulate therefrom. Additionally, the sizing and scale of the various examples can assist the user with operating the apparatus in different settings and circumstances.

Figure 12:
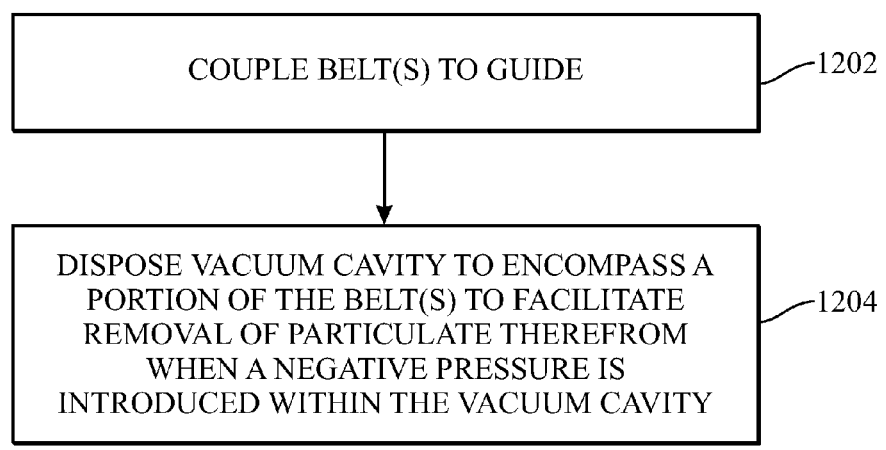
FIG. 12 illustrates a flow diagram of a method of making a cleaning apparatus according to at least one example of the present disclosure.

Additional aspects of the present disclosure relate to methods of making a cleaning apparatus, such as the cleaning apparatus 100. FIG. 12 is a flow diagram illustrating at least some steps of a method of making a cleaning apparatus according to at least one example. With reference to FIGS. 2 and 12, one or more belts 102 may be coupled to at least one guide 104, 106, at 1202. The one or more belts 102 may be so coupled to the at least one guide 104, 106 to enable the one or more belts 102 to rotate around the guide(s) 104, 106. In some instances, two belts may be employed, as described herein above with reference to FIG. 11.

At 1204, a vacuum cavity 108 may be disposed in relation to the one or more belts 102 to facilitate removal of particulate from at least a portion of the one or more belts 102 when a negative pressure is introduced within the vacuum cavity 108. For example, the vacuum cavity 108 can be positioned to at least substantially encompass a portion of the one or more belts 102. That is, the vacuum cavity 108 can be disposed in a manner that the one or more belts 102 travel entirely within the vacuum cavity 108.

Furthermore, the various adaptations and features described above may also be disposed and/or coupled to the cleaning apparatus in a manner consistent with the foregoing descriptions. For example, a rigid or flexible plane may be coupled with the guide(s) 104, 106, a vacuum compartment 114 with one or more orifices 116 may be included, an integrated vacuum device 124 and/or peripheral vacuum connector 120 may be coupled to the vacuum cavity 108, as well as other components and/or features described herein above with reference to FIGS. 1-12.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A cleaning apparatus, comprising:
 at least one brushless belt;

at least one guide coupled to the at least one brushless belt and adapted to rotate the at least one brushless belt thereabout;

at least one vacuum cavity disposed around at least a portion of the at least one brushless belt such that the belt travels into, and is partially enclosed by the at least one vacuum cavity to facilitate removal of particulate captured by the at least one brushless belt when a negative pressure is introduced therein;

an integrated vacuum device coupled with the at least one vacuum cavity to supply the negative pressure within the at least one vacuum cavity; and a handle member coupled to the integrated vacuum device; wherein the at least one brushless belt is maneuverable over a surface by a user holding the handle member coupled to the integrated vacuum device.

2. The cleaning apparatus of claim 1, wherein the at least one brushless belt comprises a supple pile plush material adapted to capture particulate and convey particulate toward the at least one vacuum cavity.

3. The cleaning apparatus of claim 1, wherein the at least one brushless belt comprises a disconnection feature whereby the at least one brushless belt is transformed from a continuous belt to a strap.

4. The cleaning apparatus of claim 1, wherein the at least one guide rotates the at least one brushless belt in reversible directions.

5. The cleaning apparatus of claim 1, further comprising at least one vacuum compartment along which the at least one brushless belt travels, wherein the at least one vacuum compartment comprises at least one orifice adapted to facilitate passage of particulate into the vacuum compartment, and wherein the negative pressure is also introduced within the at least one vacuum compartment.

6. The cleaning apparatus of claim 5, wherein the at least one brushless belt comprises at least one opening to facilitate passage of particulate therethrough toward the at least one orifice of the at least one vacuum compartment.

7. The cleaning apparatus of claim 1, wherein the at least one vacuum cavity comprises at least one protrusion which extends toward the at least one brushless belt.

8. The cleaning apparatus of claim 1, comprising two brushless belts, positioned to travel about two opposing planes.

9. The cleaning apparatus of claim 8, wherein at least one of the two opposing planes comprises a vacuum compartment comprising at least one orifice, and wherein the negative pressure is also introduced within the vacuum compartment.

10. The cleaning apparatus of claim 1, wherein the at least one brushless belt travels about a flexible plane.

11. The cleaning apparatus of claim 1, wherein the at least one guide is driven by electric power supplied thereto.

12. The cleaning apparatus of claim 1, further comprising at least one air driven device interconnected to the at least one guide and adapted to capture air and derive air power from air flow traveling toward the negative pressure.

13. The cleaning apparatus of claim 1, further comprising at least one mobility member affixed to the apparatus and adapted to facilitate mobility of the apparatus, and adapted to separate at least a portion of the at least one brushless belt from objects or surfaces to be cleaned by a fixed distance.

14. The cleaning apparatus of claim 1, further comprising at least one extension member coupled to the integrated vacuum device.

15. A method of cleaning, comprising:
rotating at least one dry belt about at least one guide;
disposing at least a portion of the at least one dry belt on a surface;
collecting particulate from the surface onto the at least one dry belt;
passing at least a portion of the at least one dry belt into at least one vacuum cavity, so the at least one dry belt is partially enclosed by the at least one vacuum cavity; and
removing at least some of the collected particulate from the at least one dry belt into the at least one vacuum cavity.

16. A method of making a cleaning apparatus, comprising:
coupling at least one brushless belt to at least one guide so the at least one brushless belt can rotate around at least a portion of the at least one guide;
disposing at least one vacuum cavity to partially enclose a portion of the at least one brushless belt to facilitate removal of particulate from the portion of the at least one brushless belt when a negative pressure is introduced therein;
coupling an integrated a vacuum device to the at least one vacuum cavity to supply the negative pressure within the at least one vacuum cavity; and
coupling at least one handle member to the integrated vacuum device;
wherein the at least one brushless belt is maneuverable over a surface by a user holding the handle member coupled to the integrated vacuum device.

17. The method of claim 16, wherein coupling the at least one brushless belt to the at least one guide comprises:
coupling two brushless belts to the at least one guide to travel about two opposing planes.

\* \* \* \* \*